United States Patent
Cho et al.

(10) Patent No.: US 12,088,187 B2
(45) Date of Patent: Sep. 10, 2024

(54) POWER SUPPLY DEVICE AND METHOD FOR CONTROLLING SAME

(71) Applicant: Samsung Electronics Co., Ltd., Suwon-si (KR)

(72) Inventors: Jehyung Cho, Suwon-si (KR); Ganghyun Kim, Suwon-si (KR); Dongjo Shin, Suwon-si (KR); Daesung Kang, Suwon-si (KR); Sungin Park, Suwon-si (KR); Hyojea Shin, Suwon-si (KR); Teaho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 108 days.

(21) Appl. No.: 18/155,456

(22) Filed: Jan. 17, 2023

(65) Prior Publication Data

US 2023/0155476 A1    May 18, 2023

Related U.S. Application Data

(63) Continuation of application No. PCT/KR2021/011671, filed on Aug. 31, 2021.

(30) Foreign Application Priority Data

Oct. 15, 2020 (KR) .......... 10-2020-0133760

(51) Int. Cl.
*H02M 5/458* (2006.01)
*H02M 1/00* (2006.01)
(Continued)

(52) U.S. Cl.
CPC .......... *H02M 1/0045* (2021.05); *H02M 1/36* (2013.01); *H02M 7/72* (2013.01); *H02P 27/06* (2013.01); *H02M 5/453* (2013.01); *H02M 5/458* (2013.01)

(58) Field of Classification Search
CPC ........ H02M 5/453; H02M 5/458; H02P 27/06
See application file for complete search history.

(56) References Cited

U.S. PATENT DOCUMENTS

| | | | |
|---|---|---|---|
| 5,119,283 A | 1/1992 | Steigerwald et al. | |
| 2014/0153300 A1* | 6/2014 | Mori ..................... | H02M 5/458 363/44 |

(Continued)

FOREIGN PATENT DOCUMENTS

| | | |
|---|---|---|
| CN | 211508931 U | 9/2020 |
| JP | 07-222457 A | 8/1995 |

(Continued)

OTHER PUBLICATIONS

International Search Report dated Dec. 22, 2021, issued in International Patent Application No. PCT/KR2021/011671.

*Primary Examiner* — Gary A Nash
(74) *Attorney, Agent, or Firm* — Jefferson IP Law, LLP

(57) ABSTRACT

A power supply device is provided. The power supply device includes a rectifier circuit for rectifying an inputted alternating current power supply, a capacitor circuit comprising a first and second capacitor which are connected in series, and smoothing the alternating current power supply rectified in the rectifier circuit, an inverter for converting the output power of the capacitor circuit to a preset power and outputting same, a switch for selectively connecting a middle node of the first capacitor and the second capacitor and an end of the alternating current power, a sensor for detecting a size of the alternating current power, and a controller which confirms a power mode of the alternating current power on the basis of an output value of the sensor, and which controls the switch so that the capacitor circuit multiplies and amplifies the selectively rectified alternating current power based on the confirmed power mode.

15 Claims, 6 Drawing Sheets

(51) Int. Cl.
    *H02M 1/36*     (2007.01)
    *H02M 5/453*     (2006.01)
    *H02M 7/72*     (2006.01)
    *H02P 27/06*     (2006.01)

(56) References Cited

U.S. PATENT DOCUMENTS

| | | | |
|---|---|---|---|
| 2014/0376282 A1* | 12/2014 | Mine | H02M 1/32 |
| | | | 363/37 |
| 2016/0268951 A1* | 9/2016 | Cho | H02M 5/458 |

FOREIGN PATENT DOCUMENTS

| | | | |
|---|---|---|---|
| JP | 08-126328 A | 5/1996 | |
| JP | 09-149643 A | 6/1997 | |
| JP | 2005-245167 A | 9/2005 | |
| JP | 2007-037302 A | 2/2007 | |
| JP | 2007-259547 A | 10/2007 | |
| JP | 2010-178594 A | 8/2010 | |
| JP | 2011-250616 A | 12/2011 | |
| KR | 10-1996-0008906 B1 | 7/1996 | |
| KR | 20-1997-0000248 Y1 | 1/1997 | |
| KR | 10-0230769 B1 | 11/1999 | |
| KR | 10-2001-0063223 A | 7/2001 | |
| KR | 10-2006-0080076 A | 7/2006 | |

* cited by examiner

POWER SUPPLY DEVICE AND METHOD FOR CONTROLLING SAME

CROSS-REFERENCE TO RELATED APPLICATION(S)

This application is a continuation application, claiming priority under § 365(c), of an International application No. PCT/KR2021/011671, filed on Aug. 31, 2021, which is based on and claims the benefit of a Korean patent application number 10-2020-0133760, filed on Oct. 15, 2020, in the Korean Intellectual Property Office, the disclosure of which is incorporated by reference herein in its entirety.

BACKGROUND

1. Field

The disclosure relates to a power supply device and a method for controlling the same. More particularly, the disclosure relates to a power supply device capable of selectively operating by varying an amplification method according to a power mode of input alternating current (AC) power supply, and a controlling method therefor.

2. Description of Related Art

A power supply device is configured to receive alternating current (AC) supply from the outside, convert the AC power supply to power supply suitable to each configuration of an electronic device and provide the power to each configuration inside.

In a country in which a high-voltage AC power supply (e.g., 220V) and a low voltage AC power supply (e.g., 127V) are used, an electronic device having a power supply device suitable for a power mode supplied to a user's living space should be selected and used, or a separate transformer should be used when the power mode of the living space is different from the available power of the power supply device.

In this environment, there is a problem in that a manufacturer should have a separate product for each power mode, and a user has to purchase a new product or use a separate transformer when the usage environment is changed.

Recently, a power supply device capable of switching to a power mode, which may be used with a switch operation, is used by using a mechanical switch. However, when a user uses a mechanical switch or incorrectly manipulates a switch, there is a problem that a product failure or damage may occur.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a power supply device capable of selectively operating by varying an amplification method according to a power mode of input AC power supply, and a control method thereof.

Additional aspects will be set forth in part in the description which follows and, in part, will be apparent from the description, or may be learned by practice of the presented embodiments.

In accordance with an aspect of the disclosure, a power supply device is provided. The power supply device includes a rectifier circuit configured to rectify an inputted alternating current power supply, a capacitor circuit comprising a first capacitor and a second capacitor which are connected in series, the capacitor circuit configured to smooth the alternating current power supply rectified in the rectifier circuit, an inverter configured to convert the output power of the capacitor circuit to a power of a preset size and outputting same, a switch configured to selectively connect a middle node of the first capacitor and the second capacitor and an end of the alternating current power, a sensor configured to detect the size of the alternating current power, and a controller configured to confirm a power mode of the alternating current power based on an output value of the sensor, and control the switch so that the capacitor circuit selectively performs double amplification for rectified alternating current power based on the confirmed power mode.

The sensor may detect a size of output power of the capacitor circuit, and the controller is further configured to confirm a power mode of the alternating current power based on a power-on/power-off state of the switch and an output value of the sensor.

The controller is further configured to, based on the switch being turned off and an output value of the sensor being lower than a preset first value, controls the switch to turn on, and based on the switch being in an off state and an output value of the sensor being higher than a preset first value, control the switch to maintain the off state.

The controller, based on the switch being turned on and the output value of the sensor being higher than a preset second value, is further configured to control the switch to turn off.

The preset second value may be a value smaller by a preset margin than a size value corresponding to over voltage protection of switched mode power supply (SMPS).

The controller, based on the switch being turned off and the output value of the sensor being smaller than a preset third value, is further configured to control the switch to turn on.

The controller is further configured to receive operation state information of the inverter and control the switch so that the capacitor circuit selectively performs double amplification based on the received operation state information and the confirmed power mode.

The controller is further configured to, based on the power mode being a low pressure mode and the operation state information being in a normal mode or an overload mode, control the switch to have a power-on state, and based on the power mode being a high pressure mode or the operation state information is in a low load mode or an idle mode, may control the switch to have a power-off state.

The power supply device may further include a motor configured to use output power of the inverter and an inverter controller configured to control the inverter to control driving of the motor.

The inverter controller is further configured to provide information about an operating state of the motor to the controller.

The information about the operation state of the motor may include at least one of an operation mode of the motor, driving speed information of the motor, information on whether the motor follows a command speed, or shortage information of the driving power.

The power supply device may further include an alternating power driving device operating in an alternating power supply and a switch circuit selectively providing the input alternating power to the driving device, and the controller may provide the confirmed information about the power mode to the switch circuit.

The switch is further configured to maintain a turn-off state when a control signal is not input.

The power supply device may further include SMPS for converting output power of the capacitor circuit to a direct current power of a preset size, and providing the direct current power to the controller.

In accordance with another aspect of the disclosure, a method of controlling a power supply device for selectively connecting a middle node of two capacitors connected in series to an end of an alternating current power source is provided. The method includes detecting a size of an alternating current power supply, confirming a power mode of the alternating current power based on detected size of the power, and controlling a switch selectively connecting the middle node and one end of the alternating current so that the capacitor circuit selectively performs double amplification based on the confirmed power mode.

The sensing may detect a size of output power of the capacitor circuit, and the confirming may confirm a power mode of the alternating current power based on a power-on/power-off state of the switch and the detected size of power.

The controlling method may include, based on the switch being turned off and an output value of the sensor being lower than a preset first value, controlling the switch to turn on, and based on the switch being in an off state and an output value of the sensor being higher than a preset first value, controlling the switch to maintain the off state.

The controlling method may include, based on the switch being turned off and the output value of the sensor being smaller than a preset third value, controlling the switch to turn on.

The controlling method may include, based on the switch being turned on and the output value of the sensor being higher than a preset second value, controlling the switch to turn off.

The preset second value may be a value smaller by a preset margin than a size value corresponding to over voltage protection of switched mode power supply (SMPS).

The controlling method may further include receiving operation state information of the inverter and the controlling may control the switch so that the capacitor circuit selectively performs double amplification based on the received operation state information and the confirmed power mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
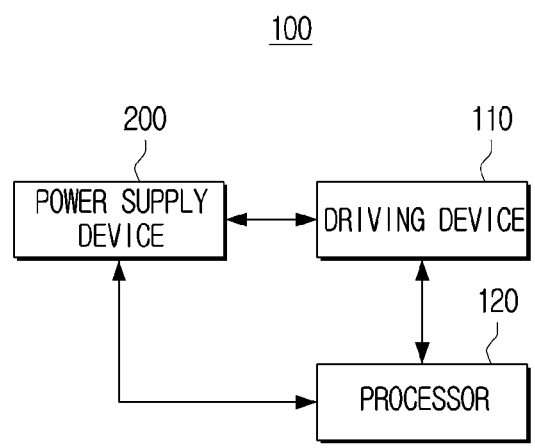
FIG. 1 is a block diagram illustrating a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms used in the disclosure and the claims are general terms identified in consideration of the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

Since the disclosure may be variously modified and have several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. When it is decided that a detailed description for the known art related to the disclosure may obscure the gist of the disclosure, the detailed description will be omitted.

Singular forms are intended to include plural forms unless the context clearly indicates otherwise. It will be further understood that terms "include" or "formed of" used in the disclosure specify the presence of features, numerals, steps, operations, components, parts, or combinations thereof mentioned in the disclosure, but do not preclude the presence or addition of one or more other features, numerals, steps, operations, components, parts, or combinations thereof.

Expressions such as "at least one of A and/or B" and "at least one of A and B" should be understood to represent "A," "B" or "A and B."

As used herein, the terms such as "$1^{st}$" or "first," "$2^{nd}$" or "second," and the like, may modify corresponding components regardless of importance or order and are used to distinguish one component from another without limiting the components.

If it is described that an element (e.g., first element) is "operatively or communicatively coupled with/to" or is "connected to" another element (e.g., second element), it may be understood that the element may be connected to the other element directly or through still another element (e.g., third element).

A term such as "module," "unit," "part," and so on is used to refer to an element that performs at least one function or operation, and such element may be implemented as hardware or software, or a combination of hardware and software. Further, other than when each of a plurality of "modules," "units," "parts," and the like must be realized in an individual hardware, the components may be integrated in at least one module or chip and be realized in at least one processor (not shown). In the following description, a term "user" may refer to a person using an electronic device, or a device (e.g., an artificial intelligence electronic device) using an electronic device.

Hereinafter, non-limiting example embodiments of the disclosure will be described in detail with reference to the accompanying drawings so that those skilled in the art to which the disclosure pertains may easily practice the disclosure. However, the disclosure may be implemented in various different forms and is not limited to embodiments described herein. In addition, in the drawings, portions unrelated to the description will be omitted, and similar portions will be denoted by similar reference numerals throughout the specification.

Hereinafter, an embodiment will be described in detail with reference to the accompanying drawings.

FIG. 1 is a block diagram illustrating a configuration of an electronic device according to an embodiment of the disclosure.

Referring to FIG. 1, an electronic device 100 may include a power supply device 200, a driving device 110, and a processor 120. The electronic device may be a home appliance or a kitchen appliance such as a refrigerator, a washing machine, a dryer, a cleaner, an induction, an air conditioner, or the like, having a driving device such as a motor and a heater, but is not limited thereto.

The power supply device 200 may supply power to each component inside the electronic device 100. Specifically, the power supply device 200 may receive AC power supply from the outside, convert the received AC power supply into a power supply of a predetermined size, and provide the converted power supply to an internal configuration.

At this time, the power supply device 200 may confirm a power supply mode of the AC power supply supplied from the outside, and selectively perform double amplification based on the confirmed power mode. The power mode may be divided into a high voltage mode in which a high voltage AC power supply (e.g., 220V) is inputted, and a low voltage mode in which a low voltage AC power supply (e.g., 127V) of a relatively low voltage is inputted according to the size of AC power supplied from the outside.

A specific configuration and operation of the power supply device 200 will be described later with reference to FIG. 2.

The driving device 110 is a device for performing a preset function of the electronic device 100. For example, when the electronic device 100 is a refrigerator, the driving device 110 is a motor for operating a compressor.

The processor 120 controls each configuration in the electronic device 100. Specifically, the processor 120 may be implemented as a Central Processing Unit (CPU), an Application Specific Integrated Circuit (ASIC), a Micro Microcontroller Unit (MCU), and the like.

The processor 120 may control the driving device 110 to perform a preset function. For example, when the electronic device 100 is a refrigerator, the operation of the motor is controlled such that the storage chamber in the refrigerator maintains a preset temperature.

The processor 120 may confirm the power supply mode of the AC power supply inputted to the power supply device 200 and control the power supply device 200 to selectively perform the double amplification operation according to the confirmed power mode. For example, the processor 120 controls the power supply device 200 not to perform the double amplification operation when the input AC power supply is in a high-pressure mode (e.g., 220V), and control the power supply device 200 to perform the double amplification operation when the input AC power is in a low-pressure mode (e.g., 127 V or 110V).

The processor 120 may determine whether to perform the double amplification in consideration of the power mode and the operation state of the driving device 110. For example, when the power mode is a low-pressure mode, double amplification should be performed, but even in a case in which a driving device does not operate, or even if low voltage is input, in case of a low-load mode in which the operation of the inverter does not have a burden, the processor 120 may control the power supply device 200 not to perform the double amplification operation.

As described above, the electronic device 100 according to the embodiment as described above confirms a power mode and selectively performs double amplification according to the confirmed power mode, so that a user does not need to separately perform a switch operation or the like according to a power mode, and a failure or damage caused by an incorrect operation may be prevented.

The electronic device 100 according to the embodiment does not perform a double amplification operation in a state where a load is not large even in a low pressure mode requiring double amplification, thereby reducing power consumption generated in an internal configuration.

In illustrating and describing FIG. 1, it has been described that the processor 120 identifies the mode of the AC power supply and performs a control operation according to the mode, but in implementation, it seems possible to identify the mode of the AC power supply by the power supply device 200 and operate.

Figure 2:
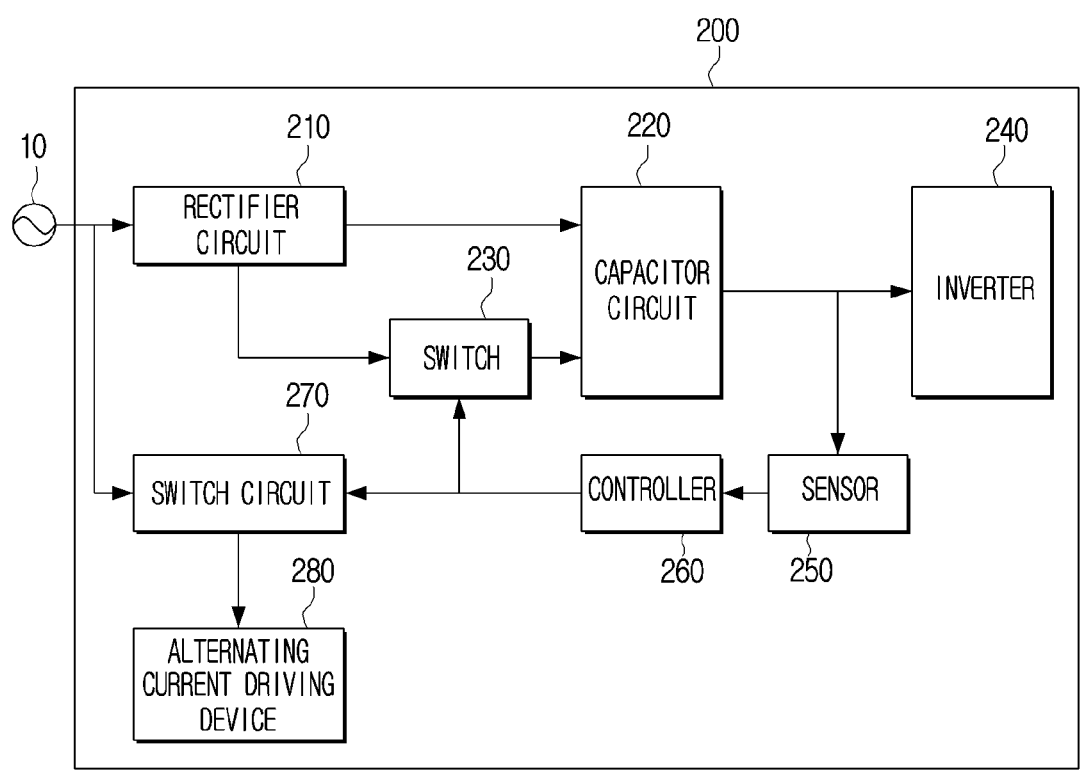
FIG. 2 is a block diagram illustrating a configuration of a power supply device according to an embodiment of the disclosure.

FIG. 2 is a block diagram illustrating a configuration of a power supply device according to an embodiment of the disclosure.

Referring to FIG. 2, the power supply device 200 may include a rectifier circuit 210, a capacitor circuit 220, a switch 230, an inverter 240, a sensor 250, a controller 260, a switch circuit 270, and an AC driving device 280.

The rectifier circuit 210 may rectify an inputted AC power supply 10. For example, the rectifier circuit 210 is configured as a full bridge circuit in which four diodes are connected in a bridge form, and external Ac power supply may be input from two neutral points of the full bridge circuit. The AC power supply 10 may be a high voltage AC power supply (e.g., 220 V) or a low voltage AC power supply (e.g., 127V).

The capacitor circuit 220 may smooth the AC power rectified by the rectifier circuit 210. For example, the capacitor circuit 220 includes a first capacitor and a second capacitor connected in series. When a switch to be described later is turned on, the capacitor circuit 220 may perform a double amplification operation.

The switch 230 selectively connects a middle node between the first capacitor and the second capacitor and one end of the AC power supply. For example, the switch 230 is implemented as a mechanical switch such as a relay or a semiconductor switch such as a Triac. One end of the switch 230 may be connected to a neutral point of the capacitor circuit 220 (i.e., an intermediate node of the first capacitor and the second capacitor) and the other end may be connected to a middle point of the rectifier circuit 210 (i.e., one end of an input terminal to which AC power supply is input).

The switch 230 may have a turn-off state (i.e., an open state) in a state in which the control signal is not inputted. The switch 230 may consume power for maintaining a turn-on state when a control signal is input and turned on. Conversely, power may not be consumed in the turn-off state.

The inverter 240 may convert the output power of the capacitor circuit 220 into a power of a predetermined size and outputs the power. Specifically, the inverter 240 generates power required for driving the driving device 110. When the driving device 110 is a motor driven by three-phase power, the inverter 240 may convert the output power of the capacitor circuit 220 into three-phase power and provide the three-phase power to the motor.

The sensor 250 may detect the size of the AC power. For example, the sensor 250 detects the size of the output power of the capacitor circuit 220. In this case, the sensor 250 may be an IC device that detects the size of the output power of the capacitor circuit 220 and provides the detected size information to the controller 260 as a digital value. Alternatively, when an ADC is provided in the controller 260, the sensor 250 may be implemented as a circuit such as a resistor and an optical transceiver or a circuit such as a transformer and a resistor.

In the disclosure, it is described that the sensor 250 detects the size of the output power of the capacitor circuit 220 to confirm the size of the AC power supply, but in implementation, the size of the AC power supply may be detected at the front end of the rectifying circuit 210, and the size of the AC power supply may be confirmed by detecting the voltage in the rectifying circuit or detecting the voltage of the link voltage or the neutral terminal.

The controller 260 may control each configuration in the power supply device 200. For example, the controller 260 may be configured as a device like MCU, and the processor of FIG. 1 may be used.

The controller 260 may confirm a power mode of input power supply. Specifically, the controller 260 may identify a power mode of the AC power supply based on an output value of the sensor 250. For example, when the power supply device 200 is operable in a low-pressure mode such as 127V and a high-pressure mode such as 220V, the controller 260 may determine whether the input AC power is a voltage mode or a high-pressure mode based on an output value of the sensor 250.

If the link voltage of the capacitor circuit 220 is approximately 180V when the AC power of 127V is input in a switch off state, and in a case in which AC power of 220V is input, the link voltage of the capacitor circuit 220 is approximately 310V, the controller 260 may confirm a low-pressure mode in a case in which the link voltage corresponding to the output value of the sensor 250 is lower than 217V, and in a case in which the link voltage is higher than 217V, the controller 260 may confirm the high-pressure mode. The above numerical values are not described in one example, and values different from those described above may be used in implementation.

When the switch 230 is turned on, the capacitor circuit 220 constitutes a voltage doubler circuit. When the power mode is a low voltage mode, that is, when the AC power of 127V is applied, the size (approximately 310V) of the voltage output from the capacitor circuit 220 has the same size value as when the AC power of 220 V is applied.

In this regard, in a case in which the sensor 250 detects the size of the output power of the capacitor circuit 220, the controller 260 may identify the power mode based on the operation state of the switch 230 as well as the output value of the sensor 250. For example, the controller 260 confirms the power mode by using only the output value of the sensor 250 in a state in which the switch 230 is turned off, and may confirm the power mode by using a value obtained by correcting the output value of the sensor 250 (e.g., processing by multiplying the output value by ½ or multiplying the output value by 1/sqrt (2)/2) when the switch 230 is turned on.

The controller 260 may control the switch 230 to configure a double amplification circuit based on the identified power mode. For example, when the low-pressure mode is confirmed, the controller 260 controls the switch 230 to turn on so that the capacitor circuit 220 operates as the double amplification circuit, and when the high-pressure mode is confirmed, the controller 260 may control so that the capacitor circuit 220 does not operate as the double amplification circuit, that is, the switch 230 is in an off-state.

It has been described that a voltage mode is confirmed based on the detected voltage value, and the switch 230 is controlled according to the confirmed voltage mode, that is, it is described that the operation is performed in two steps, but in implementation, the switch 230 may be directly controlled based on the detected voltage value.

For example, the controller 260 controls the switch 230 such that the switch 230 is turned on when the output value of the sensor 250 is lower than a preset first value in the off state of the switch 230, and control the switch 230 so that the switch 230 maintains the off state when the output value of the sensor 250 is higher than a preset first value in the off state of the switch 230. The first value may be a value (e.g., 217V) between an output value in the low-pressure mode (e.g., 180V) and an output value (e.g., 310V) in the high-pressure mode.

The controller 260 may control the switch in consideration of the HW protection level in the power supply device 200. For example, when a voltage equal to or greater than a size value corresponding to an over voltage protection is input, the SMPS automatically performs a shutdown operation. In order to prevent such shutdown, the controller 260 may control the switch 230 not to perform double amplification when the output power (or the input power of the SMPS) of the capacitor circuit 220 nears a voltage value corresponding to the overvoltage protection in the on-state of the switch 230 (i.e., during execution of the double amplification).

For example, the controller 260 controls the switch 230 such that the switch 230 is turned off when the output value of the sensor 250 is greater than a preset second value when the switch 230 is turned on. The preset second value may be a value smaller by a preset margin value than a size value corresponding to an output overvoltage protection of the SMPS. This operation will be described later with reference to FIG. 4.

The switch 230 may be controlled to turn on when the AC voltage is lowered again (i.e., when the switch is in an off state and the detected power size is smaller than a preset third value). The preset third value may be the same as the preset second value or the preset third value and may be lower than the second value.

It has been described that the controller 260 selectively performs the double amplification operation by varying the switch connection state according to the power mode, but in implementation, the controller 260 may control the connection state of the switch 230 in consideration of the driving state of the driving device (or inverter) as well as the power mode.

Specifically, a switch, such as a mechanical relay, is powered in a turn-on state, and an inverter and an SMPS, or the like, are greater in power consumption when a higher voltage is received than a low voltage. That is, it is advantageous in terms of power consumption that no double amplification is performed in a state where there is no excessiveness in operation.

The controller 260 may receive operation state information of the inverter or operation state information of the driving device (e.g., a motor), confirm whether double amplification is necessary selectively according to the received operation state information, instead of not performing constant double amplification even in a low-pressure mode, control the switch 230 to perform double amplification only when the double amplification is required, and control the switch 230 not to perform double amplification when the double amplification is not required.

For example, the controller 260 controls the switch 230 such that the switch 230 is turned on when the power mode is a low pressure mode and the operation state information is in a normal mode or an overload mode, and may control the switch 230 such that the switch 230 has an off state when the power mode is a high voltage mode or the operation state information is a low load mode or an idle mode.

Through this operation, power consumption in the power supply device 200 may be reduced than the related art.

When an AC driving device 280 such as a fan motor or a heater is included in the electronic device 100, the power supply device 200 may bypass and provide the AC power input to the AC driving device 280.

In case of an environment of operating in a low pressure mode and a high pressure mode as described above, when an AC power supply inputted without consideration of a mode is provided to the AC driving device 280 as it is, the AC driving device 280 cannot help operating with different performance depending on power modes.

In order to control the AC driving device 280 regardless of the size of the input AC power, the switch circuit 270 may be used.

The switch circuit 270 is a circuit for selectively providing the inputted AC power to the AC driving device 280, and may receive power mode information from the controller 260. The switch circuit 270 may be implemented as a triac, a thyristor, an insulated-gate bipolar transistor (IGBT), a metal-oxide-semiconductor field-effect transistor (MOSFET), or the like, and may include a detecting configuration for detecting a cross point of an AC power supply.

The switch circuit 270 may control the AC power supplied to the AC driving device 280 according to the provided power mode. For example, when power mode information indicating a low pressure mode is received, the switch circuit 270 controls the supply of the AC power by a general control method. When power mode information indicating a high voltage mode is received, the switch circuit 270 may selectively provide the AC power to the AC driving device 280 by performing a phase control or a heat amount control such as periodic on/off control.

As described above, the power supply device 200 according to an embodiment confirms a power mode and selectively performs double amplification according to the confirmed power mode, so that a user does not need to separately perform a switch operation or the like according to a power mode, and a failure or damage caused by an incorrect operation may be prevented.

In addition, the power supply device 200 according to the embodiment does not perform a double amplification operation in a state where a load is not large even in a low pressure mode requiring double amplification, thereby reducing power consumption generated in an internal configuration.

In illustrating and describing FIG. 2, a plurality of components are included in the power supply device 200, but some of the illustrated configurations may be omitted, and other configurations may be additionally included in addition to the illustrated configuration. For example, in an electronic device without directly using AC power, the switch circuit 270 and an AC driving device 280 may be omitted.

Figure 3:
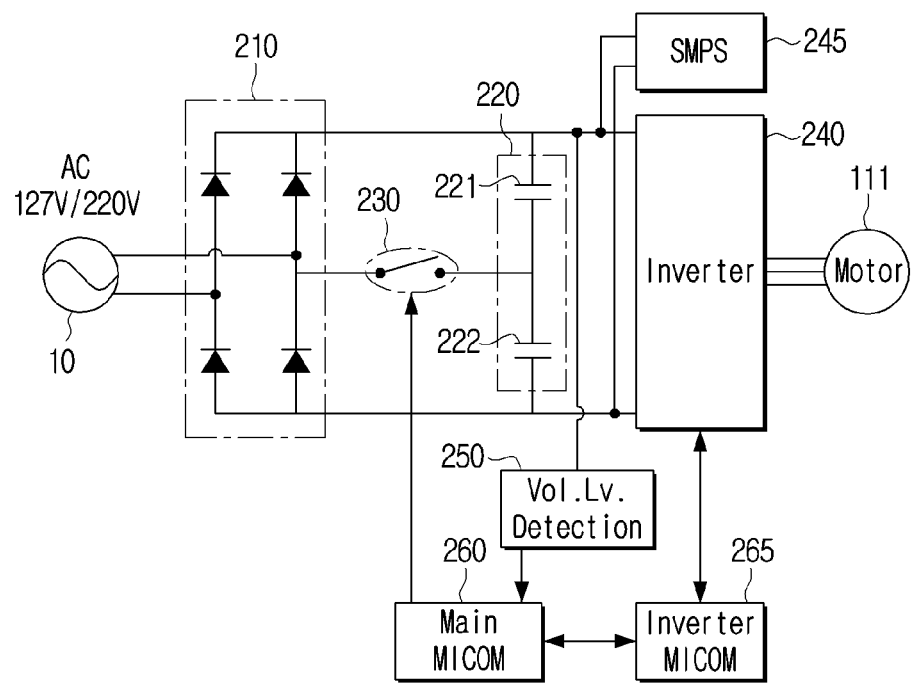
FIG. 3 is a diagram illustrating a circuit diagram of a power supply device according to an embodiment of the disclosure.

FIG. 3 is a circuit diagram of a power supply device according to an embodiment of the disclosure. Specifically, FIG. 3 is a circuit diagram of a power supply device 200 when the electronic device 100 is a refrigerator, that is, when the electronic device 100 includes a motor.

Referring to FIG. 3, the rectifier circuit 210 may include a bridge circuit in which a plurality of diodes have a bridge shape, receive a commercial AC power supply (e.g., 127V or 220V) through an input terminal, and output the rectified power through an output terminal.

The capacitor circuit 220 may include a first capacitor 221 and a second capacitor 222 connected in series. One end of the first capacitor 221 may be commonly connected to the first output terminal of the rectifier circuit 210 and the first input terminal of the inverter 240, and the other end may be connected to one end of the second capacitor 222 and one end of the switch.

One end of the second capacitor 222 may be commonly connected to the other end of the first capacitor 221 and one end of the switch 230, and the other end thereof may be commonly connected to the second output terminal of the rectifier circuit 210 and the second input terminal of the inverter 240.

One end of the switch 230 may be connected to an intermediate node of the first capacitor 221 and the second capacitor 222, and the other end thereof may be connected to a middle point in the bridge circuit. Meanwhile, in the illustrated example, one switch is used so that the capacitor circuit 220 constitutes a double circuit, but a plurality of switches may be used in implementation.

While the switch 230 is turned off, the capacitor circuit 220 performs only the operation of smoothing the power outputted from the rectifier circuit 210. In a state in which the switch 230 is turned on, the capacitor circuit 220 constitutes a voltage doubler circuit, and a double voltage for the output voltage of the rectifier circuit 210 is made at the link voltage terminal.

The inverter 240 may receive output power of the capacitor circuit 220 and may generate driving power (e.g., three-phase power) necessary for driving the motor 111 and provide the power to the motor 111.

The Switched Mode Power Supply (SMPS) 245 may receive the output power of the capacitor circuit 220 and convert the DC power of a predetermined size. The SMPS 245 may provide DC power to the controller 260, the inverter controller 265, and the like.

The SMPS 245 may include an overvoltage prevention circuit and may be reset if voltage greater than or equal to a size corresponding the output over voltage protection.

The sensor 250 may detect the size of the output power of the capacitor circuit 220 and provide the detected size information of the output power to the controller 260.

The inverter controller 265 may control the inverter 240 to control the driving of the motor 111. Specifically, the inverter controller 265 may control the inverter 240 to operate the motor 111 according to a preset algorithm, that is, to supply driving power required for driving the motor 111.

The inverter controller 265 may provide information on an operating state of the inverter or an operating state of the driving device (i.e., a motor) to the controller 260. The information on the operation state of the motor 111 may be an operation mode of the motor 111 (e.g., a mode indicating a load state such as overload/general/low load/idle), driving speed information of the motor 111, information on whether the motor follows command speed, shortage information of the driving power, and the like.

The controller 260 may confirm a power mode of the input AC power supply and may control the switch 230 according to the confirmed power mode. A specific operation of the controller 260 has been described with reference to FIG. 2 and a duplicate description will be omitted.

The controller 260 may receive information on the operating state of the inverter or the operating state of the driving device (i.e., the motor) from the inverter controller 265, determines whether to perform double amplification on the basis of the power mode and the received information, controls the switch 230 to be turned on (i.e., short) when it is determined that the double amplification is to be performed, and controls the switch 230 to be turned off (i.e., opened) when it is determined not to perform double amplification.

Although two controllers 260, 265 are included in the power supply device 200 in FIG. 3, two configurations may be implemented as one controller, and some functions of the two configurations may be implemented in a form that is performed by another device (e.g., the processor of FIG. 1) outside the power supply device 200.

Figure 4:
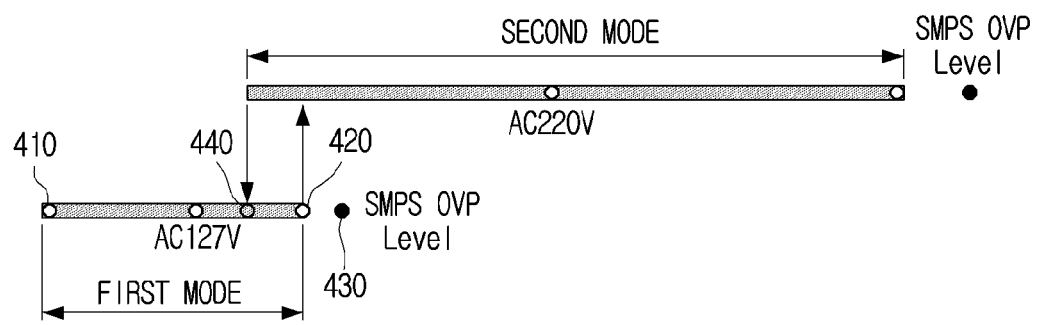
FIG. 4 is a diagram illustrating an operation of a power supply device according to a voltage mode and H/W protection level according to an embodiment of the disclosure.

FIG. 4 is a diagram illustrating an operation of a power supply device according to a voltage mode and H/W protection level according to an embodiment of the disclosure.

Referring to FIG. 4, a mode may be determined according to an input voltage range. When an initial AC power is input in operation 410, the device may operate in a first mode in which double amplification is not performed. Specifically, the output power of the capacitor circuit has a time (e.g., 3 seconds) for stabilization, and when a preset time elapses, the input voltage is detected to determine a power mode of the inputted AC power.

According to the determined power mode, the input voltage operates in a 127V mode to operate the voltage doubler circuit, and the device operates in 220V mode in a voltage greater than or equal to a preset voltage and does not operate a doubler circuit.

In the case of a low-pressure mode, the double amplification operation may be step in a voltage of the capacitor circuit which is slightly less than the voltage of performing overvoltage protection operation of the SMPS. In the case of switching from the voltage below the voltage (420) to the 220 V mode in consideration of the H/W protection level (430) as described above, even when the AC voltage is temporarily increased, no protection operation is applied and the double amplification is not performed, and thus a continuous operation according to a voltage change is possible.

On the contrary, when the voltage is lowered, a sufficient voltage may be supplied while maintaining a continuous operation in case of a level (440) to switch from a 220V mode to a 127V mode in consideration of hysteresis. For reference, in case of the doubler voltage operation, two times the input voltage is applied to the link voltage, and thus the OVP level of the two SMPSs may be the same voltage in the link voltage.

Figure 5:
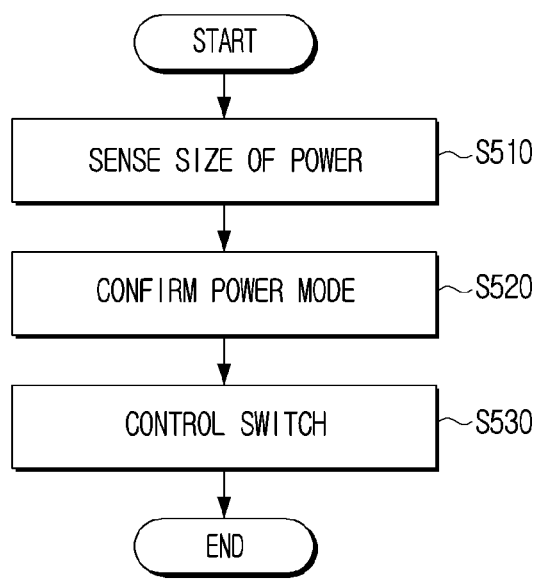
FIG. 5 is a diagram illustrating a method of controlling according to an embodiment of the disclosure.

FIG. 5 is a diagram illustrating a method of controlling according to an embodiment of the disclosure.

Referring to FIG. 5, the size of the AC power is detecting in operation S510. For example, a voltage of a node (e.g., a neutral point in a rectifier circuit, an output node of a capacitor circuit, etc.) that may detect the size of an AC power among various nodes in the power supply device may be detected.

The power mode of the AC power may be confirmed based on the detected power size in operation S520. Specifically, the power mode of the AC power supply may be confirmed based on the on/off state of the switch and the detected power level. For example, when the switch is turned off, the power mode of the AC power is confirmed by using only the size of the detected power, and when the switch is turned on, the power mode of the Ac power supply may be confirmed by correcting the size of the detected power.

Based on the confirmed power mode, the on/off state of a switch for selectively connecting the intermediate node and one end of the AC power supply is controlled so that the capacitor circuit is selectively operated as a double amplification circuit in operation S530. For example, when the switch is in an off state and the detected power size is lower than a preset first value, the switch is controlled to turn on, and when the switch is in an off state and the detected power size is higher than a preset first value, the switch may be controlled to maintain the off state.

In addition, the switch may be controlled such that the switch is turned off when the switch is on and the detected power size is greater than a preset second value (i.e., when a high AC voltage is temporarily input in the low pressure mode). When the AC voltage is lowered after the state (i.e., when the switch is in an off state and the detected power size is smaller than a preset third value), the switch may be controlled to turn on.

In addition, when the operation state information of the inverter or the motor is received, the on/off state of the switch may be controlled by additionally considering the received operation state information. That is, when the power mode is a low voltage mode and the operation state information is in a normal mode or an overload mode, the switch may be controlled to have a turn-on state, and when the power mode is a high voltage mode or the operation state information is in a low load mode or an idle mode, the switch may be controlled to have a turn-off state.

Figure 6:
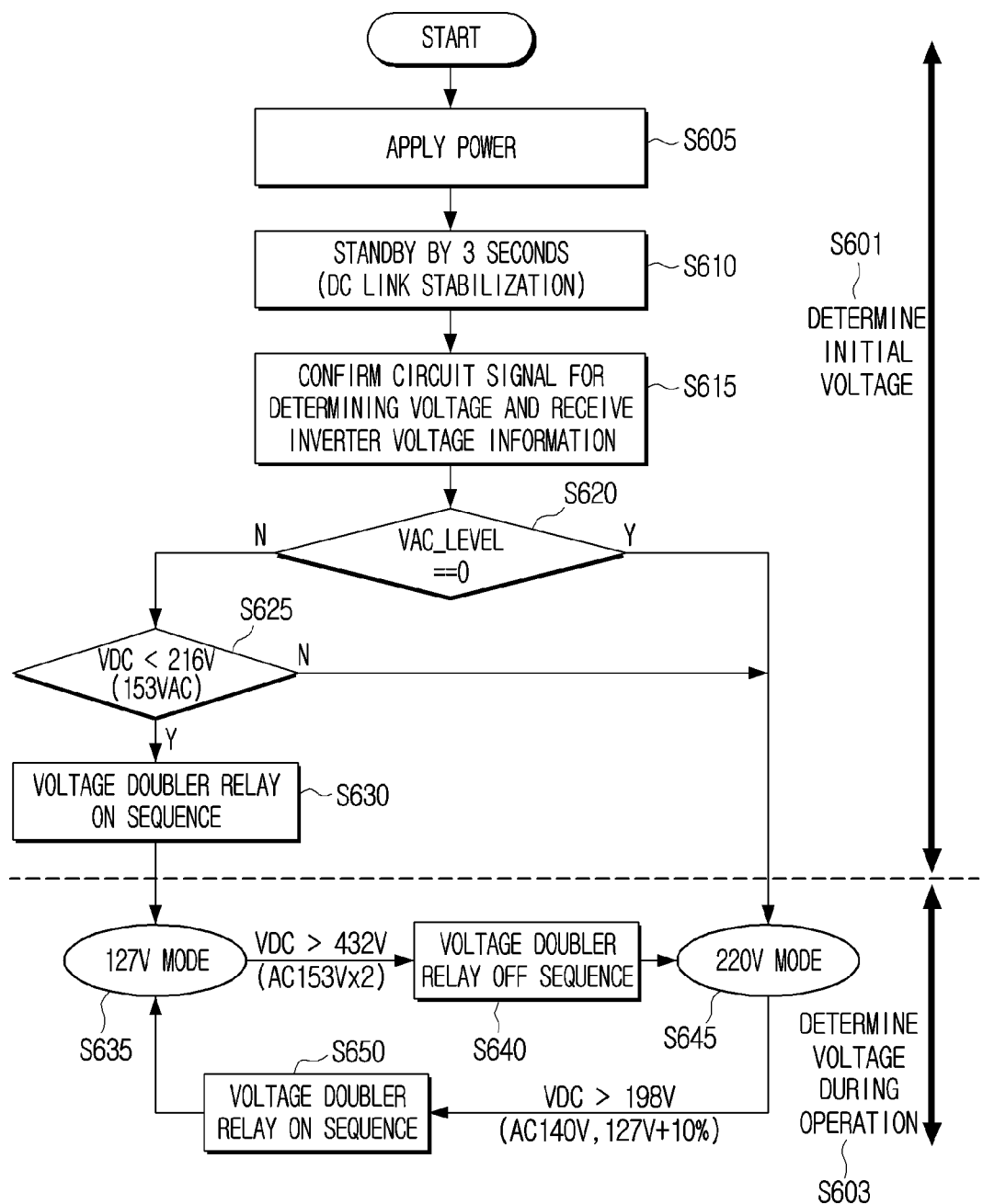
FIG. 6 is a diagram illustrating an initial operation and a control method after the initial operation according to an embodiment of the disclosure.

FIG. 6 is a diagram illustrating an initial operation and a control method after the initial operation according to an embodiment of the disclosure.

Referring to FIG. 6, an initial voltage determination operation in operation S601 is first described. When power is initially applied in operation S605, a preset time (e.g., 3 seconds) is queued so that the output power of the capacitor is maintained at a predetermined value in operation S610, and a power mode may be determined by using an output value of the sensor in operation S615, S620. For example, in a case in which the confirmed output value exceeds 217V, a high-pressure mode is confirmed in operation S625-N, and when the confirmed output value is less than or equal to 217V, the low-pressure mode is confirmed in operation S625-Y.

In a case in which the high-pressure mode is confirmed in operation S625-Y, the switch may be controlled so that double amplification is not performed in operations S630 and S635.

When the detected signal value is lower than a preset value in operation S625-N, the switch may be controlled so that the double amplification is performed in operation S645.

A voltage determination operation is described during an operation after determining an initial voltage such in operation S603.

When a low-pressure mode is initially determined, a switch may be controlled so that double amplification is not performed when the detected voltage is greater than or equal to a preset second value in operation S640. When the detected voltage is less than a preset second value, the switch may be controlled to perform a double amplification operation in operation S650.

Initially, when it is determined that the voltage is in a high-pressure mode or in a low-pressure mode, in a case in which a temporarily detected voltage is greater than or equal to a second value, the switch may be controlled to perform double amplification when it is determined that the voltage is less than a preset third value. The preset third value may be the same as the second value described above, but may have a value lower than the second value in order to perform hysteresis.

Therefore, the control method of FIG. 5 or 6 according to the embodiment confirms a power mode, and selectively performs double amplification according to the confirmed power mode, so that a user does not need to separately perform a switch operation or the like according to a power mode, and a failure or damage caused by a wrong operation may be prevented. In addition, the control method according to the embodiment may reduce power consumption generated in an internal configuration by not performing a double amplification operation in a state in which a load is not large even in a low pressure mode in which double amplification is required. The control method as shown in FIG. 5 or 6 may be executed on an electronic device having the configuration of FIG. 1 or a power supply device having the configuration of FIG. 2 or FIG. 3, and may also be executed on an electronic device or a power supply device having other configurations.

Also, the control method as described above can be implemented as a program including an executable algorithm that may be executed in a computer, and the program described above may be stored and provided in a non-transitory computer readable medium.

The non-transitory computer-readable medium does not refer to a medium that stores data for a short period of time, such as a register, cache, memory, etc., but semi-permanently stores data and is available of reading by the device. Specifically, programs of performing the above-described various methods can be stored in a non-transitory computer readable medium such as a compact disk (CD), a digital versatile disc (DVD), a hard disk, a Blu-ray disk, universal serial bus (USB), a memory card, read-only memory (ROM), or the like, and can be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A power supply device comprising:
a rectifier circuit configured to rectify an inputted alternating current power;
a capacitor circuit comprising a first capacitor and a second capacitor which are connected in series, the capacitor circuit configured to smooth the alternating current power rectified in the rectifier circuit;
an inverter configured to convert an output power of the capacitor circuit to a power of a preset size and outputting same;
a switch configured to selectively connect a middle node of the first capacitor and the second capacitor and an end of a source of the alternating current power;
a sensor configured to detects a size of the alternating current power; and
a controller configured to:
confirm a power mode of the alternating current power based on an output value of the sensor, and
control the switch so that the capacitor circuit selectively performs double amplification for rectified alternating current power based on the confirmed power mode.

2. The power supply device of claim 1,
wherein the sensor is further configured to detect a size of output power of the capacitor circuit, and
wherein the controller is further configured to confirm a power mode of the alternating current power based on a power-on/power-off state of the switch and an output value of the sensor.

3. The power supply device of claim 2, wherein the controller is further configured to:
based on the switch being turned off and an output value of the sensor being lower than a preset first value, control the switch to turn on; and
based on the switch being in an off state and an output value of the sensor being higher than a preset first value, control the switch to maintain the off state.

4. The power supply device of claim 2, wherein the controller, based on the switch being turned on and the output value of the sensor being higher than a preset second value, is further configured to control the switch to turn off.

5. The power supply device of claim 4, wherein the preset second value is a value smaller by a preset margin than a size value corresponding to over voltage protection of switched mode power supply (SMPS).

6. The power supply device of claim 4, wherein the controller, based on the switch being turned off and the output value of the sensor being smaller than a preset third value, controls the switch to turn on.

7. The power supply device of claim 1, wherein the controller is further configured to:
receives operation state information of the inverter, and
controls the switch so that the capacitor circuit selectively performs double amplification based on the received operation state information and the confirmed power mode.

8. The power supply device of claim 7, wherein the controller is further configured to:
based on the power mode being a low pressure mode and the operation state information being in a normal mode or an overload mode, control the switch to have a power-on state, and
based on the power mode being a high pressure mode or the operation state information is in a low load mode or an idle mode, control the switch to have a power-off state.

9. The power supply device of claim 1, further comprising:
a motor configured to use output power of the inverter; and
an inverter controller configured to control the inverter to control driving of the motor.

10. The power supply device of claim 9, wherein the inverter controller is further configured to provide information about an operating state of the motor to the controller.

11. The power supply device of claim 10, wherein the information about the operation state of the motor comprises at least one of:
an operation mode of the motor,
driving speed information of the motor,
information on whether the motor follows a command speed, or
shortage information of a driving power.

12. The power supply device of claim 1, further comprising:
an alternating current power driving device; and
a switch circuit configured to selectively provide the alternating current power to the driving device,
wherein the controller is further configured to provide information of the confirmed power mode to the switch circuit.

13. The power supply device of claim 1, wherein the switch is further configured to maintain a turn-off state when a control signal is not input.

14. The power supply device of claim 1, further comprising:
a switched mode power supply (SMPS) configured to:
convert output power of the capacitor circuit to a direct current power of a preset size, and
provide the direct current power to the controller.

15. A method of controlling a power supply device for selectively connecting a middle node of two capacitors connected in series to an end of an alternating current power source, the method comprising:
detecting a size of an alternating current power supply;
confirming a power mode of the alternating current power based on a detected size of the alternating current power; and
controlling a switch selectively connecting the middle node and one end of the alternating current power source so that the capacitor circuit selectively performs double amplification based on the confirmed power mode.

* * * * *